Dec. 27, 1966  R. S. W. LINDSAY  3,293,949
MULTIPURPOSE BLADE RECONDITIONING TOOL
Filed Jan. 10, 1964  2 Sheets-Sheet 1
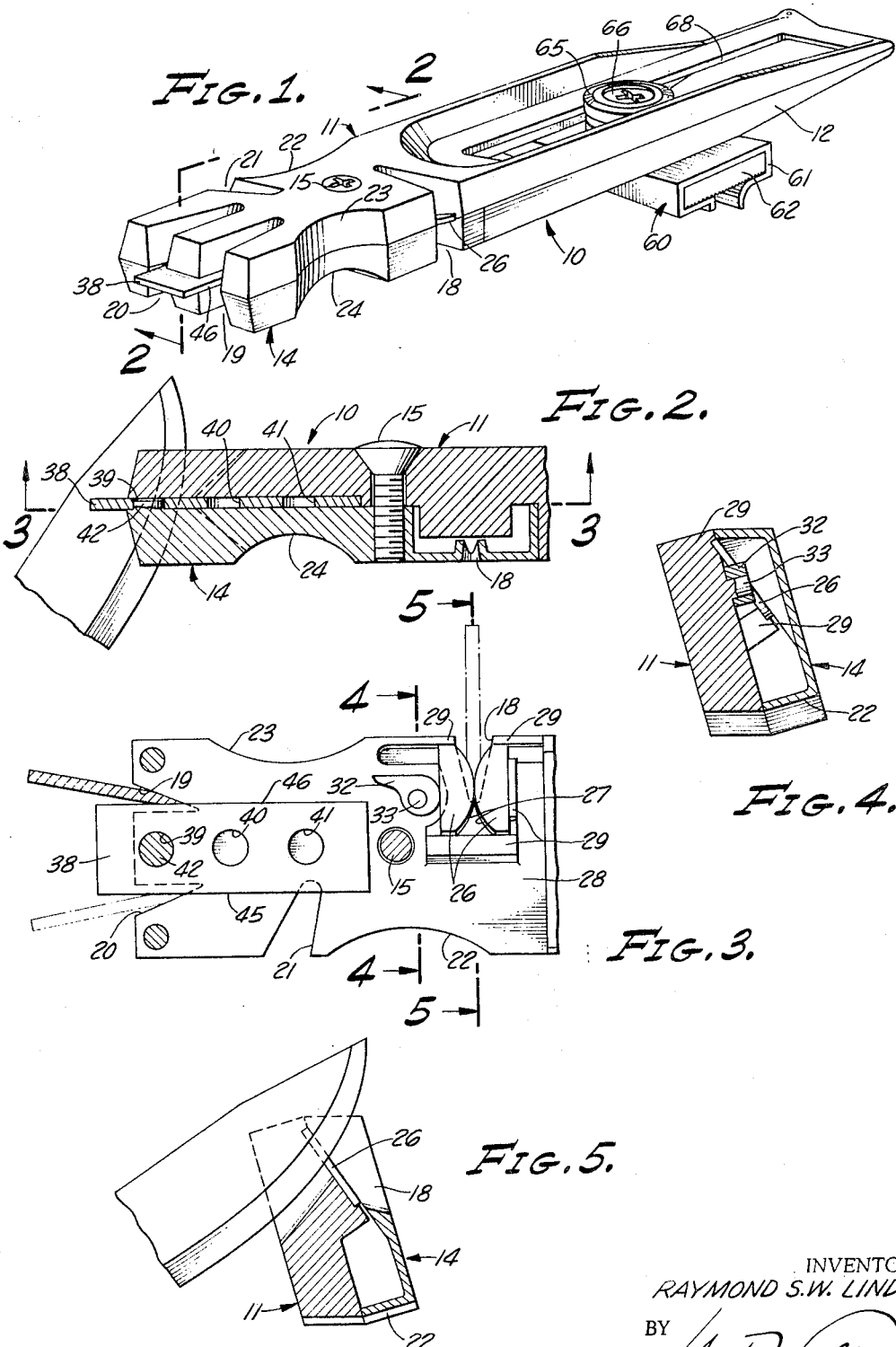
INVENTOR.
RAYMOND S.W. LINDSAY
BY
ATTORNEY

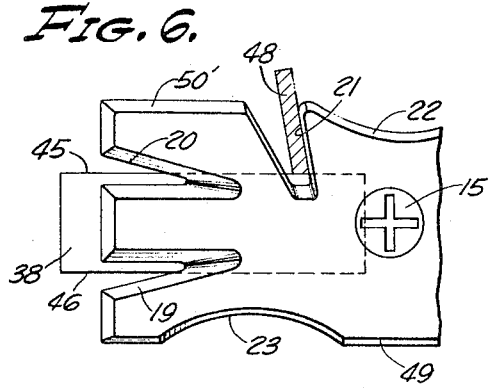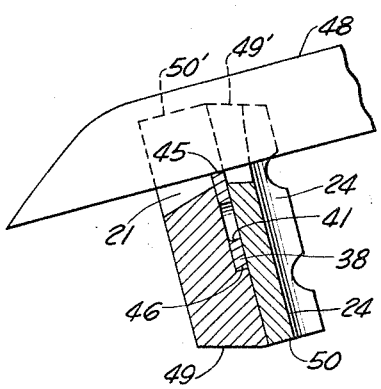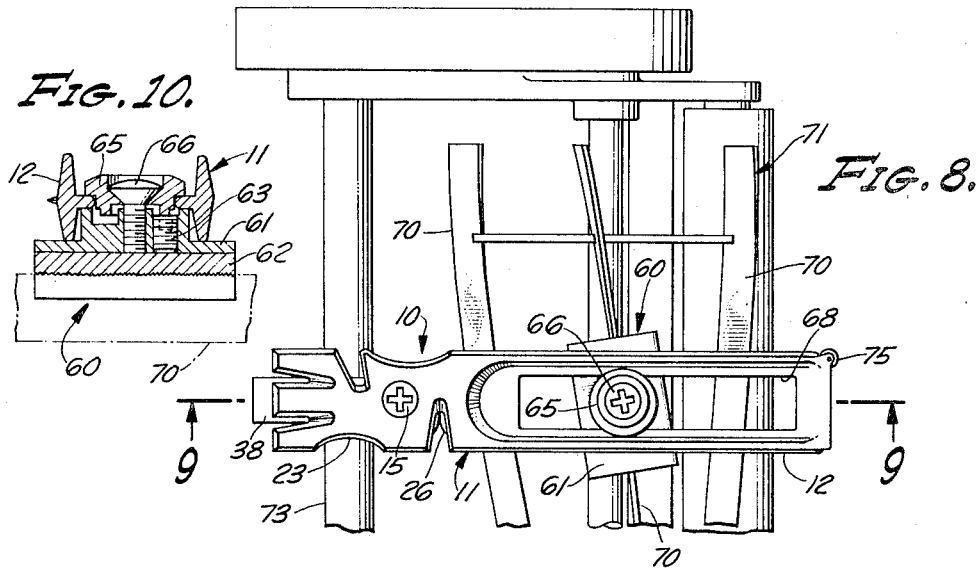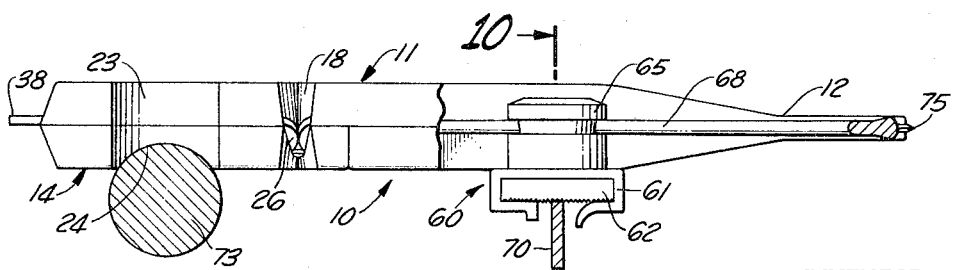

United States Patent Office 3,293,949
Patented Dec. 27, 1966

3,293,949
MULTIPURPOSE BLADE RECONDITIONING TOOL
Raymond S. W. Lindsay, 1434 Mountain Ave.,
Duarte, Calif. 91010
Filed Jan. 10, 1964, Ser. No. 336,897
6 Claims. (Cl. 76—82.2)

This invention relates to blade reconditioners and more particularly to a multipurpose hand-held tool having a plurality of inexpensive, efficient blade sharpening inserts held adjustably clamped in its main body in a manner highly effective in reconditioning the edge of a wide variety of blades, knives, scissors, garden tools, lawn mower components and the like devices found around the home.

Multipurpose blade sharpeners have been proposed heretofore suitable for sharpening the edge of more than one type of blade but none are as versatile, effective or as efficient for this purpose or as suitable for reconditioning as many different types of tools and blades as the present device. The invention tool has an elongated main body formed in two principal parts provided with a handgrip at one end for use in holding the device in one hand while moving it lengthwise relative to the blade to be reconditioned. The sharpening elements per se are preferably cast from suitable material, such as chrome or tungsten carbide, and each is adapted to be held selectively assembled in a range of positions with different portions of their sharp cutting edges exposed to the blade edge to be sharpened thereby greatly prolonging the useful life and efficiency of the tool.

More specifically the invention tool has a two piece main body firmly clampable against the opposite sides of the conditioning elements by means of a single fastener screw. Wafer like cutting elements, of which a plurality are present, have different portions of their edges lying exposed within notches opening through the end and opposite lateral edges at one end of the main body each arranged to lie at an appropriate supporting angle for a different type of blade desired to be reconditioned. One notch includes a pair of identical wafers having abutting circular edges held clamped firmly together by an eccentric concealed within the main body so that the arcuate edges of the cutting elements are useful to recondition a hollow ground edge on a blade as the latter is drawn past the sharp edges of the wafers. Another feature is the beveling of the lateral edges of the main body at different angles as a convenience in supporting the tool on edge at an appropriate inclination with one hand as the other is used to draw a knife or other blade crosswise of one of the reconditioning wafers.

Still another feature adding greatly to the versatility of the tool is the provision of a file blade or the like abrasive element firmly clamped between the guide lips of an accessory supported adjustably lengthwise of the tool handle. The lips of this element are arranged to rest loosely against the opposite side faces of a lawn mower reel blade as the tool is drawn lengthwise of the reel with the forward end of the tool body resting astride the tie rod of a conventional lawn mower and with the abrasive element bearing against the exposed edge of the reel blade undergoing truing and reconditioning. This reel sharpening accessory is mounted adjustably lengthwise of the tool body in order that different designs and sizes of lawn mowers may be accommodated using the same tool and the same abrasive element.

Accordingly it is a primary object of the present invention to provide an improved, low cost, rugged, highly versatile, multiple purpose blade reconditioning tool equally effective in reconditioning the edges of a wide range of cutting blades and tools commonly found around the household.

Another object of the invention is the provision of a multiple purpose hand-held blade reconditioning tool having small, inexpensive blade-sharpening elements held selectively supported in different positions within the tool to the end that different portions of the cutting elements may be brought into play at different times thereby greatly extending the service life and efficiency of the tool.

Another object of the invention is the provision of a hand-held universal blade reconditioning tool having provision for sharpening both conventional style and hollow ground cutting blades and additionally useful in restoring and truing the edge of a lawn mower reel.

These and other more specific objects will appear upon reading the following specification and claims and upon considering in connection therewith the attached drawing to which they relate.

Referring now to the drawing in which a preferred embodiment of the invention is illustrated:

FIGURE 1 is a perspective view of the invention tool assembled ready for use;

FIGURE 2 is a fragmentary cross sectional view on a large scale taken lengthwise through the forward end of the tool while in use to recondition a knife blade;

FIGURE 3 is a fragmentary cross sectional view taken along line 3—3 on FIGURE 2 and showing the clamping member of the main body detached and also showing the position of typical blades undergoing sharpening with respect to the reconditioning wafers;

FIGURE 4 is a cross sectional view taken along line 4—4 showing details of the clamping eccentric for the hollow grind wafers and also showing the tool supported on one of its several beveled edges against the table top;

FIGURE 5 is a view similar to FIGURE 4 but taken along line 5—5 and showing the tool in use to recondition a hollow ground edge of a knife blade;

FIGURES 6 and 7 are fragmentary views showing the tool in use to recondition a scissor blade;

FIGURE 8 is a fragmentary top plan view showing the tool as used to recondition the edge of a mower reel blade;

FIGURE 9 is a cross sectional view on an enlarged scale taken along line 9—9 on FIGURE 8; and FIGURE 10 is a fragmentary cross sectional view taken along line 10—10 on FIGURE 9.

Referring initially more particularly to FIGURE 1 there is shown a typical and preferred embodiment of the invention tool, designated generally 10, having an elongated rigid main body the major portion of which serves as a handle or handgrip 12. The forward end is specially contoured as shown in FIGURES 2, 3 and 4 to seat a complementally shaped clamping member 14 for sharpening elements, and is held firmly clamped to the main body by threaded fastener 15. The forward end of the tool and each adjacent lateral edge is provided with a plurality of specially shaped notches 18, 19, 20, 21. The opposite edges and one face of the tool are also provided with concave or arcuate shallow grooves 22, 23, 24 useful in supporting the tool against a rod or other arcuate surface while pulling the tool lengthwise thereof for purposes which will be discussed more specifically in connection with the use of the tool on a lawn mower to recondition the edges of the mower reel, and other like uses of the tool.

Referring now more particularly to FIGURES 3, 4, and 5, it is pointed out that associated with notch 18 are a pair of identical precast sharpening elements or wafers 26, 26 formed of tungsten carbide or the like and having abutting circular edges 27 held in direct firm abutment with one another centrally of the inner portion of notch 18. The interior transverse surface 28 of the main body mating with clamping member 14 is provided with abutments so positioned as to form a seating recess for wafers 26, 26 which are held in firm engagement with one another by a small eccentric 32 rotatably supported on a boss 33 cast integral with main body 11. When this eccentric is rotated clockwise as shown in FIGURE 3 it will be evident that the arcuate edges of the two wafers are pressed against one another and against the abutment 29 located remotely opposite the eccentric. The wafers are held against removal from the described recess in which they are located by this eccentric and by the concealing clamping member 14 when the latter is in place. To be observed from FIGURES 3, 4 and 5 is the fact that wafers 26 are supported in a common plane inclined acutely to a transverse medial plane extending longitudinally of tool 10.

The sharpening element or wafer of tungsten carbide associated with blade seating notches 19, 20, 21 comprises a single thin elongated strip or wafer 38 best shown in FIGURE 3. This wafer is preferably provided with a plurality of openings 39, 40, 41 distributed lengthwise therealong and selectively mateable with boss 42 integral with main body 11 and positioned as best shown in FIGURE 3. Wafer 38, as is true respecting the two wafers just described, may be inverted, switched end for end as well as mounted with a different one of the openings registering with boss 42. This arrangement provides for exposing or presenting different portions of the sharpened edges 45, 46 to a blade seating in positioning notches 19, 20, 21 and undergoing sharpening. Thus if one portion of the wafer edge becomes damaged or dull in use, another portion can be brought into registry with the blade notches by removing fastener screw 15 and readjusting the wafer elements, then reclamping member 14 in place.

Referring to FIGURES 6 and 7 a mode of using the tool to support a scissor blade 48 while being supported in notch 21 will be quite evident. Note that the lateral edges of tool body 11 are beveled at different angles relative to the flat faces of the tool body and facilitate support of the tool at the most convenient and appropriate angle for sharpening a particular blade. Thus when sharpening a scissor blade it is convenient to grip the tool handgrip in the right hand while holding beveled edge 49 against a table top as the scissor blade is drawn crosswise of the portion of sharpening element 38 exposed in notch 21. As herein shown, the diagonally opposed pairs of edges 50, 50' and 49, 49' lie parallel to one another along the diagonally opposite lateral edge corners of the main body.

Referring now more particularly to FIGURES 8, 9 and 10 the lawn mower reel sharpening accessory designated generally 60 will be described. This accessory comprises an open-ended generally channel shaped member 61 embracing an abrasive element 62, such as a section of a file blade, held clamped within member 61 by set screw 63 (FIGURE 10). Abrasive element holder 61 is held clamped against one face of the tool handle 12 by a clutching disc 65 and an adjustable clamping screw 66 threaded into member 61. It will be understood that accessory 60 is slidable along a slot 68 extending lengthwise of the tool handle and may be clamped in any position therealong by tightening screw 66 in the manner made evident by a consideration of FIGURE 10.

To use the described tool to recondition the edge of a blade 70 of a lawn mower reel 71, the tool is positioned as shown in FIGURES 8 and 9. Thus with the lawn mower proper resting on the ground in its normal position the transverse concave groove 24 crosswise of the forward end of the tool is seated against the mower frame tie rod 73 with the lips of channel shaped member 61 resting astride blade 70. The operator then grasps the tool handle firmly between his thumb and fingers and pulls the tool lengthwise of tie rod 73 while pressing it downwardly to bring the serrated abrasive face of element 62 against the edge of reel blade 70. The lips of the abrasive holder engage the opposite faces of the reel blade causing slight rotation of the reel in order that the reel blade 70 will always lie in a radial plane perpendicular to the lower face of abrasive element 62. This assures reconditioning the reel blade with a true and sharp cutting edge.

If desired, accessory 60 may be detached from the tool when not in use to sharpen a lawn mower, an operation accomplished simply by removing screw 66 temporarily and then restoring it between the parts until they are again needed for assembly to the handle of tool 10.

It remains to point out that the tool preferably is provided with a sharp edged cutter 75 rotatably supported in a slot at one corner of the tool handle to the end that the tool is suitable for use as a glass cutter.

While the particular multipurpose blade reconditioning tool herein shown and disclosed in detail is fully capable of attaining the objects and providing the advantages hereinbefore stated, it is to be understood that it is merely illustrative of the presently preferred embodiments of the invention and that no limitations are intended to the details of construction or design herein shown other than as defined in the appended claims.

I claim:

1. A multipurpose blade reconditioning tool having an elongated rigid main body formed in two interfitting halves provided with a handgrip at one end and having four differently shaped notches opening through the end and each lateral edge of its other end, a single thin wafer blade sharpening insert having sharp-cornered edges rigidly supported between the halves of said main body with portions of its sharp edges projecting into three of said notches each adapted to engage and shave at least one face edge of a blade as the blade is inserted in a selected notch and drawn across the exposed edge of said wafer, a fourth notch opening through the edge of said tool having a pair of sharp-edged sector-shaped sharpening elements in edge-to-edge abutment and exposed therein for sharpening hollow-ground blades, and cam lever means for detachably and releasably clamping said sector-shaped sharpening elements in place in said main body.

2. A blade reconditioning tool as defined in claim 1 characterized in that said single wafer is formed with a series of openings therethrough adapted to seat over a locator pin between the adjacent faces of said main body halves to support said single blade in different adjusted positions with a different area of its edges positioned for blade sharpening.

3. A blade reconditioning tool as defined in claim 1 characterized in that said single wafer comprises an elongated thin strip member having a plurality of openings therethrough and spaced apart lengthwise of said main body, one of the adjacent faces of said main body halves being provided with a boss having a loose fit with different ones of said openings whereby said elongated strip wafer can be selectively assembled in different positions lengthwise of said main body to present different portions of its sharp edges in exposed positions within certain of the notches in said main body.

4. A multipurpose blade reconditioning tool having a two piece elongated main body adapted to be held in the hand while sharpening a blade, a plurality of sharp edged cutting wafers held immovably but releasably gripped between said parts of two piece main body with the sharp blade shaving corners thereof exposed within notches formed crosswise of the edge of said tool, a semicircular groove extending crosswise of one face of said main body near one end thereof and adapted to seat over the tie rod extending across and forming part of a conventional hand-propelled lawn mower forwardly of its reel, and an abrasion member holder securable to one face of said tool handgrip and including guide members positioned to engage the opposite faces of a reel blade and to rotate the reel through a small arc as the user propels said tool along the lawn mower tie rod with said abrasion member held pressed against the edge of the reel blade to sharpen the same.

5. A blade reconditioning tool useable to sharpen the edge of a wide variety of blades including scissors, knives, garden tools and the like, said tool having a thick but wide elongated main body having a handgrip at one end and having its lateral edges inclined at different angles to the faces of said main body to support said tool against a table top at a predetermined angle while a particular type of blade undergoing sharpening is drawn crosswise through a notch formed in the opposite lateral edges of said main body, a plurality of deep notches formed through the opposite edges and through one transverse end of said main body, abrasion-resistant blade sharpening wafers held rigidly assembled within said main body with sharp edges thereof exposed within each of said notches, the sides of said notches being differently shaped and positioned to hold different blades at the proper angle relation to said sharp edges while the blade is being drawn through a particular one of said notches with one face of its cutting edge lying in a shaving position with respect to a sharp edge of a wafer.

6. A blade reconditioning tool as defined in claim 5 characterized in that a pair of said wafers are identical segments having circular abutting edges held pressed firmly together and partially exposed within one of said notches and effective to recondition the opposite faces of a hollow-ground knife blade as the blade is drawn crosswise between said pair of wafers.

References Cited by the Examiner
UNITED STATES PATENTS

| | | | |
|---|---|---|---|
| 56,615 | 7/1866 | Russ | 76—82.2 |
| 1,851,520 | 3/1932 | Moller. | |
| 2,203,551 | 6/1940 | Stuart | 76—82.1 |
| 2,994,234 | 8/1961 | Lizak | 76—86 |

GRANVILLE Y. CUSTER, JR., *Primary Examiner.*